(12) United States Patent
Asada (10) Patent No.: US 6,311,120 B1
(45) Date of Patent: Oct. 30, 2001

(54) AUTOMATIC SPEED CONTROL DEVICE FOR VEHICLE

(75) Inventor: Tetsuya Asada, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/226,156

(22) Filed: Jan. 7, 1999

(30) Foreign Application Priority Data

Jan. 8, 1998 (JP) .................................................. 10-002366

(51) Int. Cl.⁷ ............................... B60T 7/12; B60K 31/00
(52) U.S. Cl. ............................ 701/96; 701/93; 701/300; 340/903; 367/87
(58) Field of Search .................................. 701/96, 41, 93, 701/300, 301; 340/903, 933, 435; 367/87, 99, 89, 118

(56) References Cited

U.S. PATENT DOCUMENTS

| | | | |
|---|---|---|---|
| 4,670,845 | * 6/1987 | Etoh | 364/461 |
| 4,757,450 | * 7/1988 | Etoh | 364/426 |
| 5,400,864 | * 3/1995 | Winner et al. | 180/169 |
| 5,529,139 | * 6/1996 | Kurahashi et al. | 180/169 |
| 5,629,851 | 5/1997 | Williams et al. | 364/426.044 |
| 5,678,650 | * 10/1997 | Ishihara et al. | 180/169 |
| 5,695,020 | 12/1997 | Nishimura | 180/169 |
| 5,761,629 | * 6/1998 | Gilling | 701/96 |
| 5,977,869 | * 11/1999 | Andreas | 340/441 |
| 6,081,762 | * 6/2000 | Richardson et al. | 701/93 |
| 6,081,763 | * 6/2000 | Smith et al. | 701/93 |

FOREIGN PATENT DOCUMENTS

| | | |
|---|---|---|
| 605 104 | 7/1994 | (EP) . |
| 760 485 | 3/1997 | (EP) . |

* cited by examiner

*Primary Examiner*—Tan Nguyen
*Assistant Examiner*—Dalena Tran
(74) *Attorney, Agent, or Firm*—Foley & Lardner (57) ABSTRACT

An automatic speed control device for a vehicle includes a distance measuring sensor 3, a vehicle speed sensor 5 and a control unit 9 for controlling the vehicle speed. In the control unit 9, a target speed determining section 11 determines a target speed corresponding to a distance detected by the distance measuring sensor 3 and the vehicle speed detected by the vehicle speed sensor 5. A speed storing section 13 of the control unit 9 stores the detected vehicle speed as a set speed. A selecting section 15 of the control unit 9 selects a smaller speed of the target speed and the set speed. A speed control section 17 of the control unit 9 controls the vehicle speed so as to be the smaller speed selected by the selecting section 15. When losing the preceding vehicle, the speed control section 17 further controls the vehicle speed so as to maintain a present vehicle speed until the driver's vehicle reaches a lost point where the preceding vehicle was lost.

17 Claims, 8 Drawing Sheets

AUTOMATIC SPEED CONTROL DEVICE FOR VEHICLE

BACKGROUND OF THE INVENTION

1. Field of the Invention

The present invention relates to an automatic speed control device for a vehicle. More particularly, it relates to an automatic speed control device which is capable of preventing a vehicle from approaching the preceding vehicle incautiously.

2. Description of the Related Art

There is an earlier automatic speed control device which includes a distance measuring sensor for detecting a distance and an angle between the vehicle concerned and the preceding vehicle. Note, the distance between the driver's vehicle and the preceding vehicle will be referred as "distance between the vehicles", hereinafter. In the automatic speed control device, when detecting the preceding vehicle during traveling at a speed established by a driver, the driver's vehicle is automatically decelerated for a distance (or a time) predetermined corresponding to respective traveling velocities of the driver's vehicle and the preceding vehicle and thereafter, the driver's vehicle is traveled while keeping the distance between the vehicles. When the preceding vehicle changes its traffic lane and disappears from a traffic lane of the driver's vehicle, then it is automatically accelerated up to the speed established in advance.

In the conventional automatic speed control device, however, when the distance measuring sensor loses track of the preceding vehicle under the influence of, for example, curves, slopes, weather or the like, there is a possibility of causing a problem that the driver's vehicle is automatically accelerated in spite of existence of the preceding vehicle, so that the distance between the vehicles is reduced incautiously.

SUMMARY OF THE INVENTION

It is therefore an object of the present invention to provide an automatic speed control device which is capable of preventing a driver's vehicle from approaching the preceding vehicle incautiously.

The above-mentioned object of the present invention can be accomplished by an automatic speed control device for controlling a speed of a driver's vehicle depending on an existence of a preceding vehicle traveling ahead of a driver's vehicle, the automatic speed control device comprising:

speed control section for controlling a vehicle speed of the driver's vehicle so as to realize a predetermined distance between the driver's vehicle and the preceding vehicle when there exists the preceding vehicle traveling ahead of the driver's vehicle, the predetermined distance being established corresponding to both of the vehicle speed of the driver's vehicle and a vehicle speed of the preceding vehicle in advance; and further controlling the driver's vehicle to accelerate to a preset vehicle speed when the preceding vehicle is lost;

wherein, when losing track of the preceding vehicle, the speed control section at least controls the vehicle speed of the driver's vehicle so as to maintain a vehicle speed of the driver's vehicle at a time of losing the preceding vehicle at least until the driver's vehicle arrives at a lost point where the preceding vehicle was lost.

According to the above arrangement, by controlling the vehicle speed so as to maintain a present vehicle speed until the driver's vehicle reaches the lost point, even if losing track of the preceding vehicle, it is possible to prevent the driver's vehicle from approaching the preceding vehicle incautiously.

In the second aspect of the invention, the above-mentioned object of the present invention can be also accomplished by an automatic speed control device for controlling a speed of a driver's vehicle depending on an existence of a preceding vehicle traveling ahead of a driver's vehicle a vehicle, the automatic speed control device comprising:

a distance measuring unit for measuring a distance between the driver's vehicle and the preceding vehicle;

a speed detecting unit for detecting a vehicle speed of the driver's vehicle;

a target speed determining section for determining a target speed corresponding to the distance detected by the distance measuring unit and the vehicle speed detected by the speed detecting unit;

a speed storing section for storing the vehicle speed detected by the speed detecting unit as a set speed;

a selecting section for selecting a smaller speed of the target speed determined by the target speed determining section and the set speed stored by the speed storing section; and a speed control section for controlling the vehicle speed so as to be the smaller speed selected by the selecting section;

wherein, when losing the preceding vehicle, the speed control section further controls the vehicle speed so as to maintain a vehicle speed of the driver's vehicle at a time of losing the preceding vehicle until the driver's vehicle arrived at a lost point where the preceding vehicle was lost.

With the above-mentioned constitution, even if losing track of the preceding vehicle, it is possible to prevent the driver's vehicle from approaching the preceding vehicle incautiously.

According to the third aspect of the invention, in the above-mentioned automatic speed control device, when the preceding vehicle cannot be detected by the distance measuring unit and when the lost point is included in a curve larger than a predetermined curve, the speed control section controls the vehicle speed so as to maintain a vehicle speed of the driver's vehicle at a time of losing the preceding vehicle.

With the above-mentioned operation of the speed control section, even if losing track of the preceding vehicle entering the curve, it is possible to prevent the driver's vehicle from approaching the preceding vehicle incautiously.

According to the fourth aspect of the invention, in the above-mentioned automatic speed control device, when the preceding vehicle cannot be detected by the distance measuring unit and when the lost point is contained in a straight load, the speed control section controls the vehicle speed so as to increase to the set speed stored in the speed storing section.

By accelerating the vehicle to the set speed on the assumption that the preceding vehicle has changed its traffic lane, it is possible to prevent the driver's vehicle from approaching the preceding vehicle incautiously.

According to the fifth aspect of the invention, the above-mentioned automatic speed control device of the second aspect further comprises a steering angle detecting unit for detecting a steering angle of the driver's vehicle. In such an establishment, when it is judged on the basis of the steering angle of the driver's vehicle that the driver's vehicle is traveling in a regular curve represented by a steering angle more than a predetermined steering angle, the speed control section controls the vehicle speed so as to maintain a present vehicle speed.

With the above operation of the speed control section, even if losing track of the preceding vehicle entering the curve, it is possible to prevent the driver's vehicle from approaching the preceding vehicle incautiously.

According to the sixth aspect of the invention, in the above-mentioned automatic speed control device of the second aspect, the speed control section controls the vehicle speed so as to maintain a present vehicle speed until the preceding vehicle is detected again by the speed detecting unit.

With the above operation of the speed control section, it is possible to prevent the driver's vehicle from incautiously approaching the preceding vehicle until the preceding vehicle is detected again by the speed detecting unit.

According to the seventh aspect of the invention, the above-mentioned automatic speed control device of the second aspect further comprises a steering angle detecting unit for detecting a steering angle of the driver's vehicle. In such an establishment, when it is judged on the basis of the steering angle of the driver's vehicle that the driver's vehicle travels in a curve larger than a predetermined curve and when no preceding vehicle travels in front of the driver's own vehicle, the speed control section controls the vehicle speed so as to increase to the set speed.

By accelerating the vehicle to the set speed on the assumption that the preceding vehicle has changed its traffic lane during traveling the curve, even if losing the preceding vehicle while the driver's vehicle is traveling the curve, it is possible to prevent the driver's vehicle from approaching the preceding vehicle incautiously.

According to the eighth aspect of the invention, there is also provided an automatic speed control device for controlling a speed of a driver's vehicle depending on an existence of a preceding vehicle traveling ahead of a driver's vehicle, the automatic speed control device comprising:
- a distance measuring unit for measuring a distance between the driver's vehicle and the preceding vehicle and an angle of the preceding vehicle to the driver's vehicle;
- a speed detecting unit for detecting a vehicle speed of the driver's vehicle;
- a steering angle detecting unit for detecting a steering angle of the driver's vehicle;
- a slope change judging section for judging whether there is a predetermined slope change at a traveling point of the preceding vehicle, on the basis of the an angle of the preceding vehicle;
- a target speed determining section for determining a target speed corresponding to the distance detected by the distance measuring unit and the vehicle speed detected by the speed detecting unit;
- a speed storing section for storing the vehicle speed detected by the speed detecting unit as a set speed;
- a selecting section for selecting a smaller speed of the target speed determined by the target speed determining section and the set speed stored by the speed storing section; and
- a speed control section for controlling the vehicle speed so as to be the smaller speed selected by the selecting section;
- wherein, when the preceding vehicle is lost and it is judged that there exists the predetermined slope change in the vicinity of a lost point of losing the preceding vehicle by the slope change judging section, the speed control section further controls the vehicle speed so as to maintain a vehicle speed of the driver's vehicle at a time of losing the preceding vehicle.

By maintaining the present speed on the assumption that the preceding vehicle has been lost due to the slope change, it is possible to prevent the driver's vehicle from approaching the preceding vehicle incautiously.

According to the ninth aspect of the invention, in the above-mentioned automatic speed control device of the eighth aspect, when the preceding vehicle is lost and when it is judged that there is no slope change in the lost point by the slope change judging section, the speed control section controls the vehicle speed so as to increase to the set speed.

By accelerating the vehicle to the set speed on the assumption that the preceding vehicle has changed its traffic lane, it is possible to prevent the driver's vehicle from approaching the preceding vehicle incautiously.

According to the tenth aspect of the invention, in the above-mentioned automatic speed control device of the eighth aspect, when the preceding vehicle is lost and it is judged that there exists the predetermined slope change in the vicinity of a lost point of losing the preceding vehicle by the slope change judging section, the speed control section further controls the vehicle speed so as to maintain the present vehicle speed as long as a predetermined distance.

With the above operation of the speed control section, even if the preceding vehicle is lost due to the slope change, it is possible to prevent the driver's vehicle from incautiously approaching the preceding vehicle.

According to the eleventh aspect of the invention, in the above-mentioned automatic speed control device of the tenth aspect, when no preceding vehicle is detected even after the driver's vehicle's traveling the predetermined distance, the speed control section controls the vehicle speed so as to increase to the set speed.

With the above operation of the speed control section, even after the preceding vehicle has been lost due to the slope change, it is possible to prevent the driver's vehicle from incautiously approaching the preceding vehicle.

According to the twelfth aspect of the invention, the above-mentioned automatic speed control device of the eighth aspect further comprises a distance measuring area judging section for judging which parts of a distance measuring area of the distance measuring unit the preceding vehicle is traveling, on the basis of the distance and the angle detected by the distance measuring unit. In such an establishment, when the preceding vehicle is lost in a central part of the distance measuring area and it is judged that there exists the predetermined slope change in the vicinity of the lost point of losing the preceding vehicle, the speed control section further controls the vehicle speed so as to maintain the present vehicle speed.

By maintaining the present speed on the assumption that the preceding vehicle has been lost due to the slope change, it is possible to prevent the driver's vehicle from approaching the preceding vehicle incautiously.

According to the thirteenth aspect of the invention, the above-mentioned automatic speed control device of the eighth aspect further comprises:
- a distance measuring area judging section for judging which parts of a distance measuring area of the distance measuring unit the preceding vehicle is traveling, on the basis of the distance and the angle detected by the distance measuring unit; and
- an informing unit for informing the driver that the distance measuring unit is in an inactivated condition when the preceding vehicle is lost in a central part of the distance measuring area and it is judged that there is no slope change in the vicinity of the lost point of losing the preceding vehicle.

Owing to the provision of the informing unit, it is possible to inform the driver that the distance measuring unit has a malfunction or the distance measuring condition gets worse and allow the driver to drive the vehicle appropriately in response to this information. As the result, it is possible to prevent the driver's vehicle from incautiously approaching the preceding vehicle.

According to the fourteenth aspect of the invention, the above-mentioned automatic speed control device of any one of the third, seventh, ninth and tenth aspects further comprises:

- a distance measuring area judging section for judging which parts of a distance measuring area of the distance measuring unit the preceding vehicle is traveling, on the basis of the distance and the angle detected by the distance measuring unit; and
- a motion vector detecting section for detecting a motion vector representing that the preceding vehicle moves laterally. In such an establishment, when the preceding vehicle is lost in an outside part of the distance measuring area and when the motion vector before losing the preceding vehicle directs outward, the speed control section controls the vehicle speed so as to either maintain the present vehicle speed or increase to the set speed. Furthermore, when the preceding vehicle is lost in an outside part of the distance measuring area and when the motion vector before losing the preceding vehicle directs inward, the speed control section selects any one of control methods of maintaining the present vehicle speed; increasing the present vehicle speed to the set speed; and maintaining the present vehicle speed as long as a predetermined distance.

With the above-mentioned operation of the speed control section, it is possible to prevent the driver's vehicle from incautiously approaching the preceding vehicle.

According to the fifteenth aspect of the invention, the above-mentioned automatic speed control device of the second or eighth aspect further comprises a distance measuring area judging section for judging which parts of a distance measuring area of the distance measuring unit the preceding vehicle is traveling, on the basis of the distance and the angle detected by the distance measuring unit. In such an establishment, when the preceding vehicle is lost in the farthest part of the distance measuring area, the speed control section further controls the vehicle speed so as to increase the set speed.

By accelerating the vehicle to the set speed on the assumption that the preceding vehicle is traveling over the distance measuring limit of the device, it is possible to prevent the driver's vehicle from approaching the preceding vehicle incautiously.

According to the sixteenth aspect of the invention, the above-mentioned automatic speed control device of the second or eighth aspect further comprises a distance measuring area judging section for judging which parts of a distance measuring area of the distance measuring unit the preceding vehicle is traveling, on the basis of the distance and the angle detected by the distance measuring unit. In such an establishment, when the preceding vehicle is lost in the nearest part of the distance measuring area, the speed control section further controls the vehicle speed so as to maintain the vehicle speed just before losing the preceding vehicle or decrease at a deceleration rate just before losing the preceding vehicle.

With the operation of the speed control section, even if the preceding vehicle approaches the driver's vehicle, it is possible to prevent the driver's vehicle from approaching the preceding vehicle incautiously.

According to the seventeenth aspect of the invention, the above-mentioned automatic speed control device of the sixteenth aspect further comprises an informing unit for informing the driver that the distance measuring unit is in an inactivated condition.

Owing to the provision of the informing unit, it is possible to inform the driver that the distance measuring unit is in its inactivated condition has a malfunction and also allow the driver to drive the vehicle appropriately in response to this information. As the result, it is possible to prevent the driver's vehicle from incautiously approaching the preceding vehicle.

The above and other features and advantages of this invention will become apparent, and the invention itself will best be understood, from a study of the following description and appended claims, with reference to the attached drawings showing some preferred embodiments of the invention.

DESCRIPTION OF THE PREFERRED EMBODIMENT

Embodiments of the present invention will be described with reference to the drawings hereinafter.

(1st. embodiment)

Figure 1:
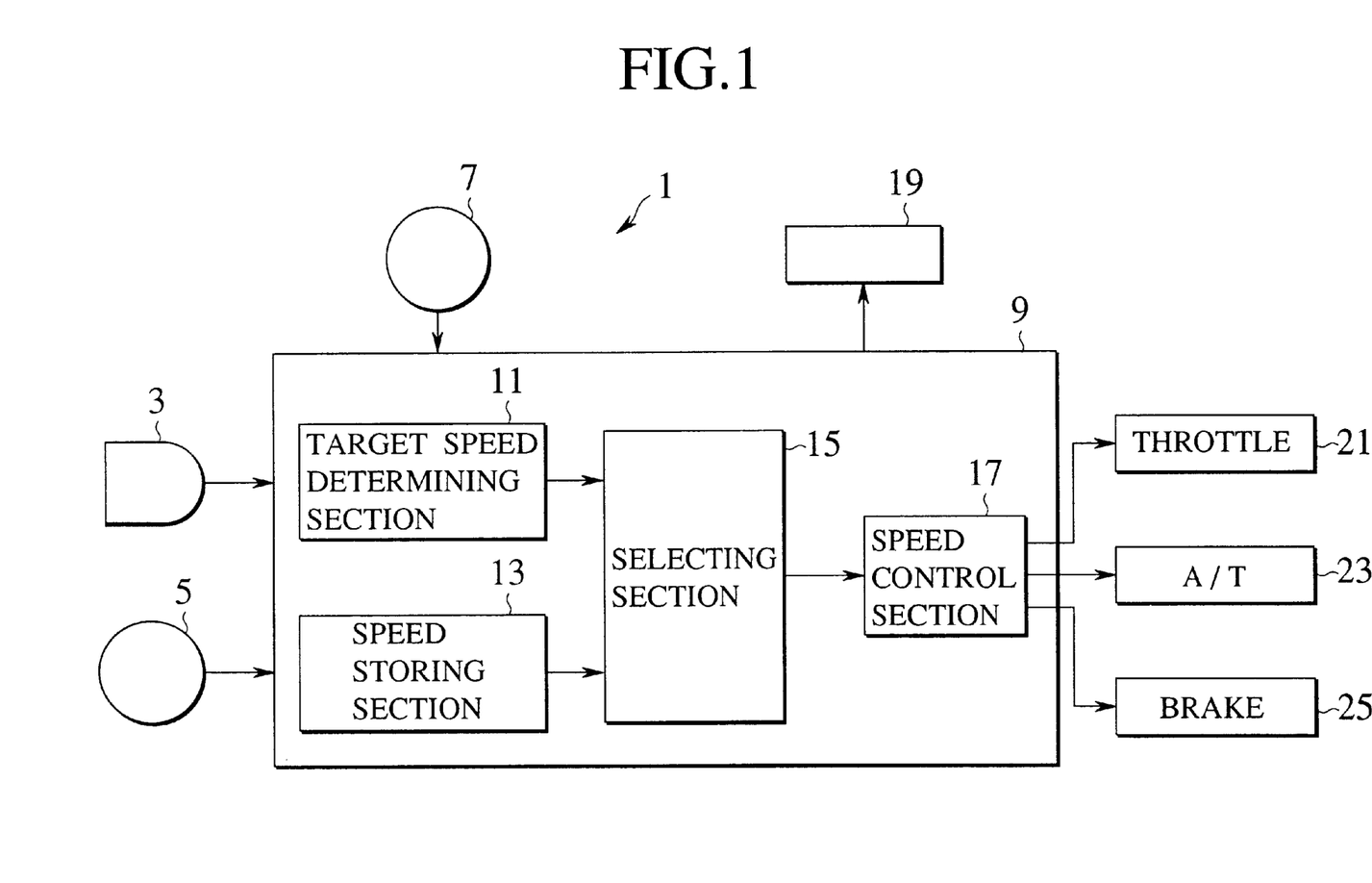
FIG. 1 is a systematic constitution of an automatic speed control device in accordance with first to third embodiments of the present invention.

FIG. 1 shows a systematic constitution of an automatic speed control device 1 in accordance with a first embodiment of the present invention.

Now referring to FIG. 1, the automatic speed control device 1 includes a distance measuring sensor 3 for detecting a distance and an angle between a driver's vehicle and another vehicle preceding the driver's vehicle, a vehicle speed sensor 5 for detecting a speed of the driver's vehicle on the basis of pulse signals generated from a rotary encoder attached to an axle of the vehicle, a steering angle sensor 7 for detecting an angle of steering on the basis on pulse signals generated from a rotary encoder attached to a spindle of a steering wheel of the vehicle, a control unit 9 for controlling the vehicle speed on the basis of respective detection signals detected by the sensors 3, 5, 7, an alarm unit 19 for giving an attention alarm from the device 1 to the driver, a throttle 21 for controlling fuel supply to be ejected into an engine corresponding to an opening command generated from the control unit 9, an automatic transmission (A/F) 23 which changes a transmission ratio in response to a positional command generated from the control unit 9, and a brake 25 which holds each wheel disc between opposing braking pads in response to a hydraulic pressure command from the control unit 9, for decelerating or stopping the vehicle. Note, the steering angle sensor 7 may be replaced with a yaw rate sensor which generates a voltage representing a yaw angle of the vehicle, in the modification.

The control unit 9 comprises a target speed determining section 11 for determining the vehicle speed as the vehicle's target speed corresponding to both of the distance detected by the distance measuring sensor 3 and the vehicle speed detected by the vehicle speed sensor 5, a set-speed storing section 13 for memorizing the vehicle speed inputted from the vehicle speed sensor 5 at a point of time when a not-shown control switch close to the steering wheel is pushed on during the vehicle's traveling, as the vehicle's set speed, a selector unit 15 for selecting either the vehicle's target speed determined by the target speed determining section 11 or the vehicle's set speed stored by the set-speed storing section 13, for example, a smaller speed, and a speed control section 17 for calculating the opening command, the position command and the hydraulic pressure command corresponding to the vehicle speed selected by the selector unit 15.

With reference to FIG. 1, we describe the normal operation of the automatic speed control device 1.

First of all, on the driver's pushing on the not-shown control switch close to the steering wheel, the vehicle speed inputted from the vehicle speed sensor 5 at that time is previously stored in the set-speed storing section 13, as the vehicle's set speed. Then, in case of no vehicle in front of the driver's vehicle, the selector unit 15 outputs the vehicle's set speed set in the set-speed storing section 13 to the speed control section 17. On the contrary, in case of discovering the preceding vehicle during the vehicle's traveling at the vehicle's set speed, the target speed determining section 11 determines the vehicle's target speed corresponding to the distance between the preceding vehicle and the driver's vehicle and the present vehicle speed. At this time, the selector unit 15 selects a smaller one of the vehicle's target speed determined by the target speed determining section 11 and the vehicle's set speed stored by the set-speed storing section 13. Then, the speed control section 17 calculates the opening command, the position command and the hydraulic pressure command corresponding to the vehicle speed generated from the selector unit 15 and generates these commands to the throttle 21, the automatic transmission (A/F) 23 and the brake 25, respectively. Consequently, the vehicle is automatically decelerated so as to realize the predetermined distance and sequentially traveled while keeping the predetermined distance. On the other hand, when the preceding vehicle disappears from a traffic lane of the driver's vehicle's due to the lane changing etc., then the driver's vehicle can be accelerated to the predetermined vehicle speed automatically.

Further, when losing track of the preceding vehicle, the speed control section 17 controls the opening command, the position command and the hydraulic pressure command so as to maintain the present vehicle speed until the driver's vehicle reaches the lost point. Thus, in such a case of losing the preceding vehicle, it is possible to prevent the driver's vehicle from approaching the preceding vehicle incautiously.

Figure 2:
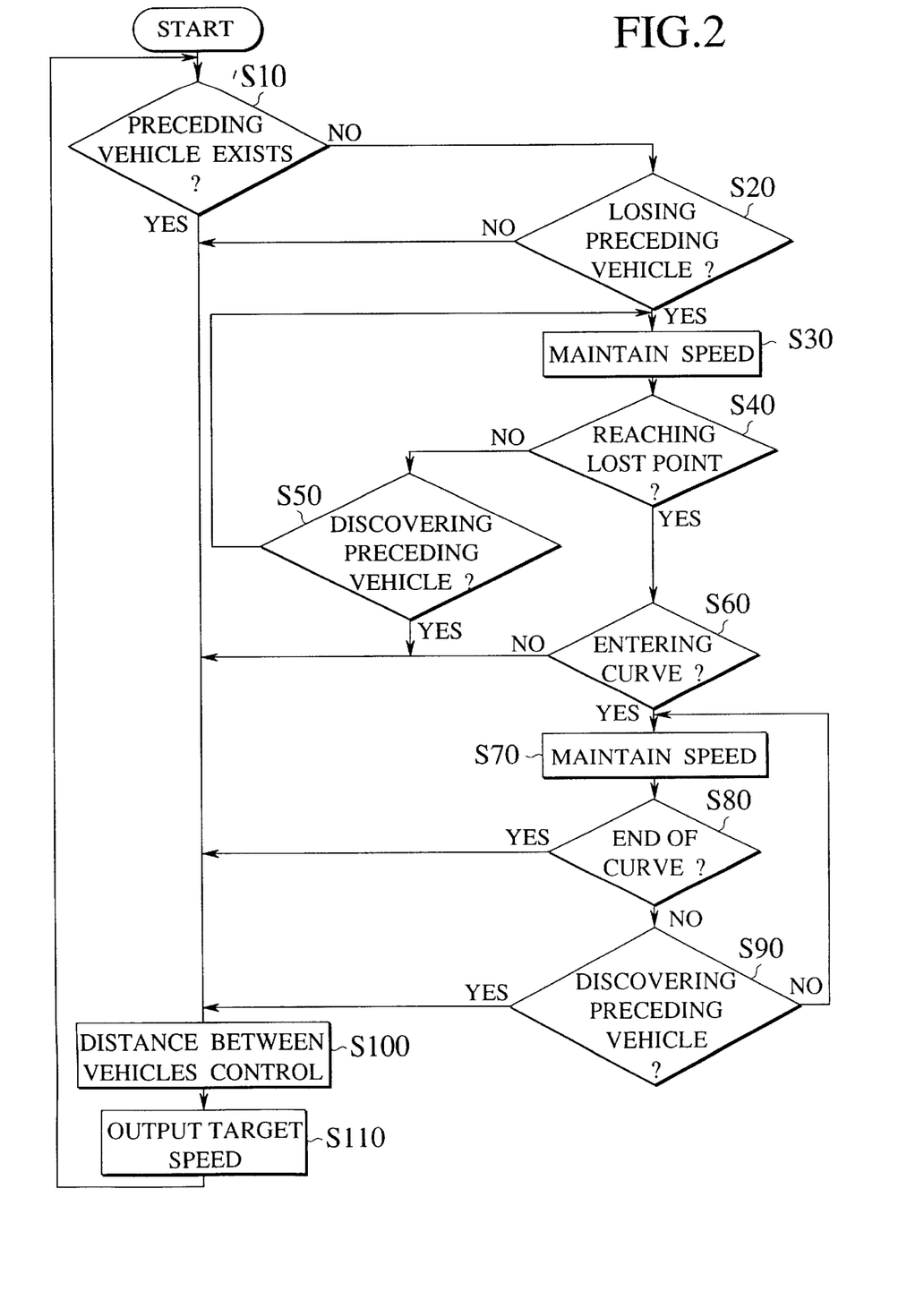
FIG. 2 is a flow chart for explanation of an operation of the automatic speed control device of the first embodiment of the invention.
Figure 3A:
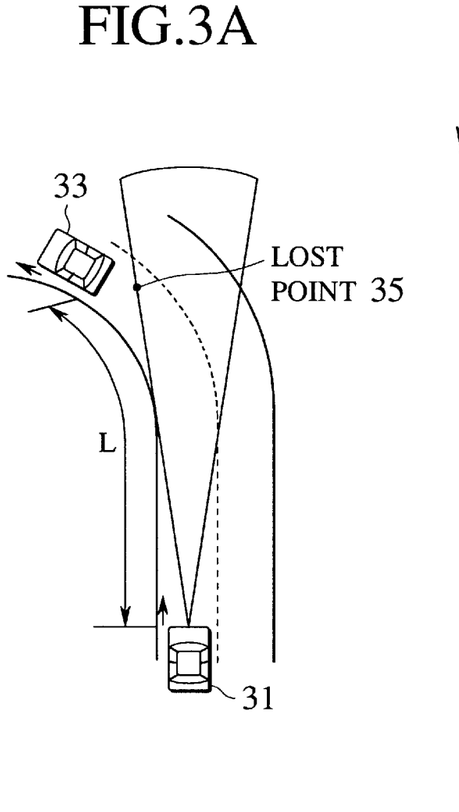
FIG. 3A is a diagram illustrating that the preceding vehicle going round a curve.
Figure 3B:
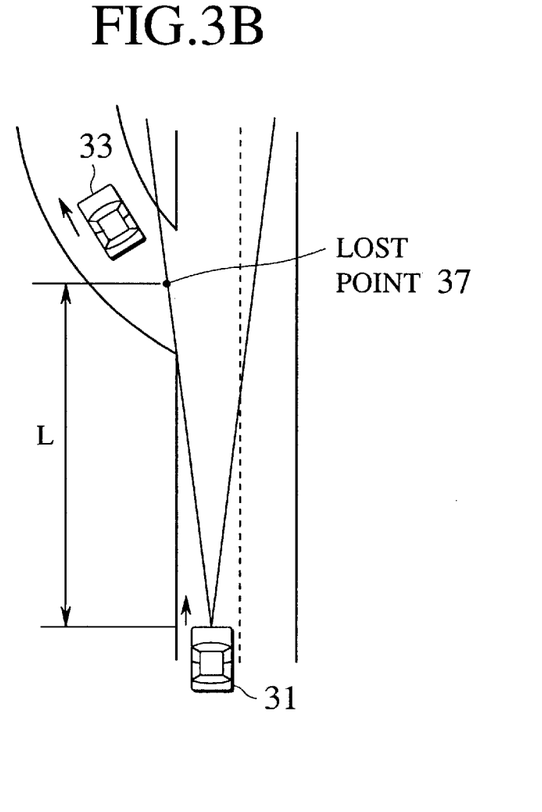
FIG. 3B is a diagram illustrating that the preceding vehicle diverging from the traffic lane where the driver's vehicle is traveling.

Next, referring to FIGS. 3A and 3B, we describe the operation of the automatic speed control device 1 while using a flow chart of FIG. 2. Note, FIG. 3A illustrates the preceding vehicle going round a curve, while FIG. 3B illustrates the preceding vehicle diverging from the traffic lane where the driver's vehicle is traveling.

At first step S10, it is judged whether or not the preceding vehicle is traveling in front of the driver's vehicle on the basis of the detection signal from the distance measuring sensor 3. In case of existing the preceding vehicle, the routine skips to step S100. In case of no preceding vehicle on the other hand, then the routine goes to step S20.

Next, at step S20, it is judged whether or not the device 1 loses track of the preceding vehicle on the basis of the distance measuring sensor 3. When losing the preceding vehicle, it is firstly executed to detect a distance L between the driver's vehicle and the lost point by the detection signal from the distance measuring sensor 3. At the same time, by integrating the actual vehicle speed outputted from the vehicle speed sensor 3, it is carried out to measure a traveling distance of the driver's vehicle that it travels since the device 1 has lost the preceding vehicle. In this way, the routine goes to step S30. On the other hand, in case of still capturing the preceding vehicle, the routine skips to step S100.

At step S100, it is carried out to control the distance between the vehicles as the above-mentioned normal operation of the device 1. Thus, the target speed determining section 11 determines the vehicle's target speed corresponding to the distance between the vehicles and the vehicle speed of the driver's vehicle. At this time, the selector unit 15 selects a smaller one of the vehicle's target speed determined by the target speed determining section 11 and the vehicle's set speed stored by the set-speed storing section 13. At subsequent step S110, it is executed by the speed control section 17 to calculate the opening command, the position command and the hydraulic pressure command corresponding to the vehicle speed generated from the selector unit 15 and generate these commands to the throttle 21, the automatic transmission (A/F) 23 and the brake 25, respectively. Consequently, the driver's vehicle is automatically decelerated for the preset distance between the vehicles and thereafter, the vehicle keeps on traveling while maintaining the preset distance between the vehicles.

At step S30, it is executed that the vehicle travels while maintaining the vehicle speed before losing the preceding vehicle. In detail, the selector unit 15 allows the target speed determining section 11 to memorize the vehicle speed at a point of time when the preceding vehicle has traveled in front of the driver's vehicle and generates the vehicle speed to the speed control section 17. Then, the speed control section 17 calculates the opening command, the position command and the hydraulic pressure command corresponding to the vehicle speed generated from the selector unit 15 and generates these commands to the throttle 21, the automatic transmission (A/F) 23 and the brake 25, respectively. Consequently, the driver's vehicle keeps on traveling at the so-established vehicle speed.

Next, at step S40, it is judged whether or not the driver's vehicle has just arrived at the lost point where the preceding vehicle was lost. In other words, it is judged whether or not the traveling distance resulting from the integration of actual vehicle's velocity amounts to the distance L for the lost point detected by the distance measuring sensor 3 at step S30. When the judgement at step S40 is Yes, that is, the vehicle has arrived at the lost point, then the routine goes to step S60. On the contrary, when the judgement at step S40 is No, that is, the vehicle has not arrived at the lost point yet, then the routine goes to step S50.

At step S50, it is judged whether or not the device 1 discovers the preceding vehicle again before the driver's vehicle arrives at the lost point. Thus, it is judged whether the device 1 detects the preceding vehicle on the basis of the detection signal from the distance measuring sensor 3. If the preceding vehicle is detected (Yes), then the routine goes to step S100. On the other hand, if the preceding vehicle is not detected (No), then the routine returns to step S30 and thereafter, a series of processes will be repeated by the time of "Yes" at step S40 or step S50.

At step S60, it is judged whether or not the driver's vehicle enters a curve as the vehicle arrives at the lost point. Thus, it is judged whether the steering angle exceeds a predetermined angle on the basis of the detection signal from the steering angle sensor 7. Now, it should be noted that there are two cases of losing the preceding vehicle: one is a case that the preceding vehicle enters the curve (see FIG. 3A) and the other is a case that the preceding vehicle enters the diverging point (see FIG. 3B). When the driver's vehicle enters the curve, then the routine goes to step S70. On the other hand, when the driver's vehicle does not enter the curve but travels on a straight road, the routine goes to step S100.

At step S70, as it is estimated the preceding vehicle travels ahead of the curve, it is executed to allow the driver's vehicle to travel while maintaining the vehicle speed before losing the preceding vehicle. In detail, the selector unit 15 allows the target speed determining section 11 to memorize the vehicle speed at a point of time when the preceding vehicle has traveled in front of the driver's vehicle and generates the vehicle speed to the speed control section 17. Then, the speed control section 17 calculates the opening command, the position command and the hydraulic pressure command corresponding to the vehicle speed generated from the selector unit 15 and generates these commands to the throttle 21, the automatic transmission (A/F) 23 and the brake 25, respectively. Consequently, the driver's vehicle keeps on traveling at the so-established vehicle speed.

At step S80, it is judged whether or not the driver's vehicle escapes out of the curve. Thus, it is judged whether the steering angle is less than the predetermined angle on the basis of the detection signal from the steering angle sensor 7. If the driver's vehicle does escape out of the curve (Yes), then the routine goes to step S100. On the other hand, if the driver's vehicle has not escaped out of the curve yet (No), then the routine returns to step S90.

At step S90, it is judged whether or not the device 1 discovers the preceding vehicle under condition that the driver's vehicle has not escaped out of the curve yet. Thus, it is judged whether the device 1 detects the preceding vehicle on the basis of the detection signal from the distance measuring sensor 3. If the preceding vehicle is detected (Yes), then the routine goes to step S100. On the other hand, if the preceding vehicle is not detected (No), then the routine returns to step S70 and thereafter, a series of processes will be repeated by the time of "Yes" at step S80 or step S90.

In this way, since the distance measuring sensor 3 possesses a regular distance measuring area of e.g. ±6° in the horizontal direction, the preceding vehicle's going out of the above distance measuring area means that the device 1 loses track of the preceding vehicle. As shown in FIG. 3A, when the preceding vehicle 33 is out of the distance measuring area since it enters the curve, it is expected that the driver's vehicle 31 will enter the same curve if only the vehicle 31 travels the distance L to the lost point 35 of the preceding vehicle 33. On the other hand, as shown in FIG. 3B, when the preceding vehicle travels apart from the traffic lane of the driver's vehicle's due to the preceding vehicle's lane-changing or entering an interchange etc., the driver's vehicle will not enter the curve even if it travels to the lost point 37 of the preceding vehicle 33.

Therefore, in case case that the driver's vehicle enters the curve even after reaching the lost point 35 (or 37), the vehicle 31 is controlled so as to maintain the vehicle speed during further traveling the curve. When the vehicle does not enter the curve even after reaching the lost point 35 (or 37), the vehicle begins to accelerate to the set speed on judgement that the preceding vehicle has escaped out of the traffic lane of the driver's vehicle's. In this way, it is possible to prevent the driver's vehicle from approaching the preceding vehicle incautiously.

Additionally, when losing the preceding vehicle in a center area of the distance measuring area (i.e. a distance measuring area A of FIG. 8), the device 1 controls to maintain the present speed of the vehicle. However, when the driver's vehicle escapes from the curve and enters the straight lane, it is expected that the preceding vehicle may enter the distance measuring area again. Therefore, when the preceding vehicle cannot be found at a point of time of escaping the curve, then the vehicle is begun to accelerate to the set speed in consideration that the preceding vehicle has is escaped out of the traffic lane of the driver's vehicle's while it is traveling in the curve. When finding the preceding vehicle again during the driver's vehicle's maintaining the vehicle speed, then the driver's vehicle is brought into the normal control mode for the preset distance between the vehicles. In this way, it is possible to realize the driving control more reflecting the driver's will and coping with the surrounding traffic situation.

(2nd. embodiment)

The systematic constitution of an automatic speed control device in accordance with a second embodiment of the present invention is similar to that of the automatic speed control device 1 of FIG. 1. Therefore, a description regarding to the constitution will be deleted.

Figure 4:
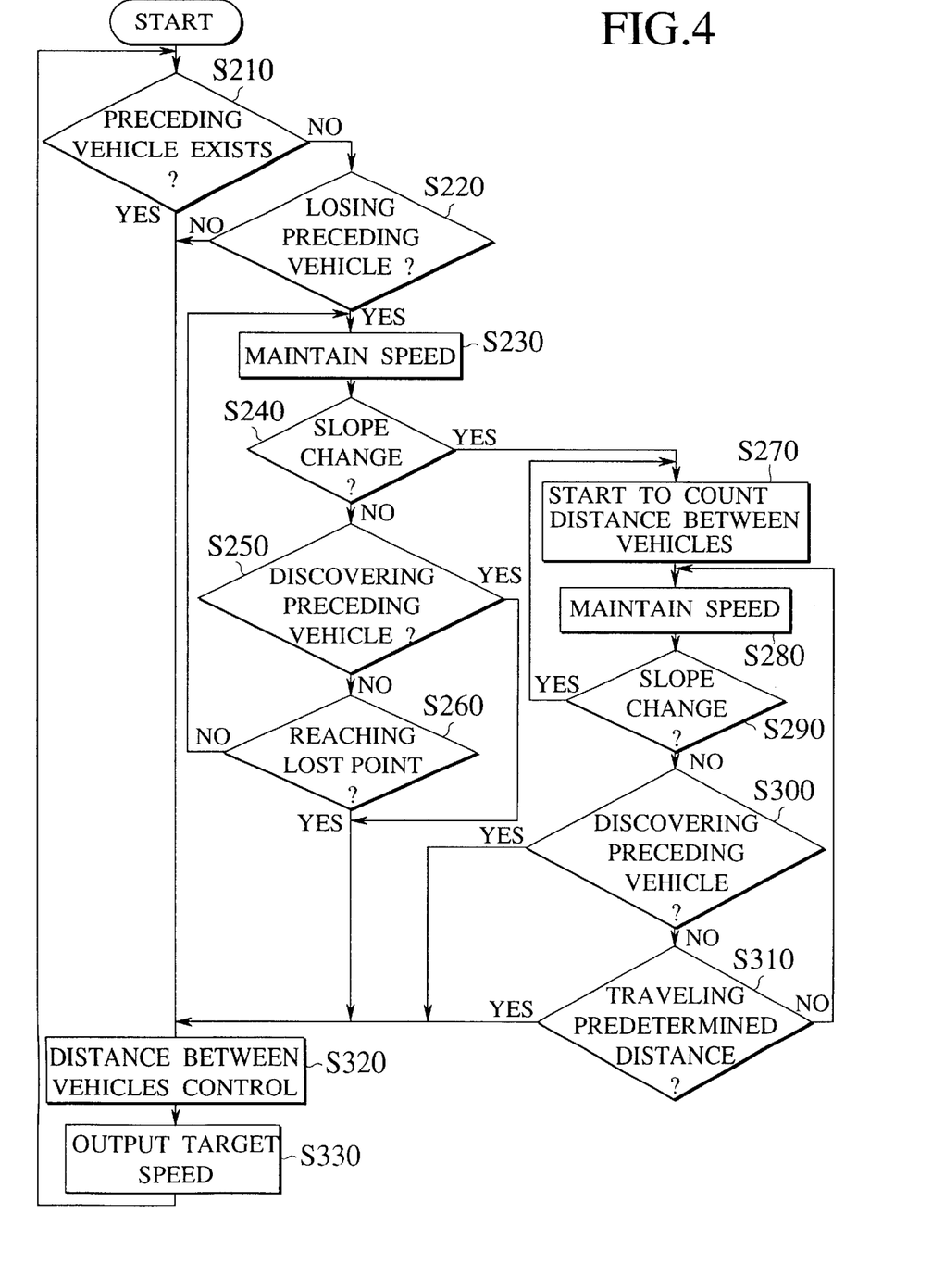
FIG. 4 is a flow chart for explanation of an operation of the automatic speed control device of the second embodiment of the invention.
Figure 5A:
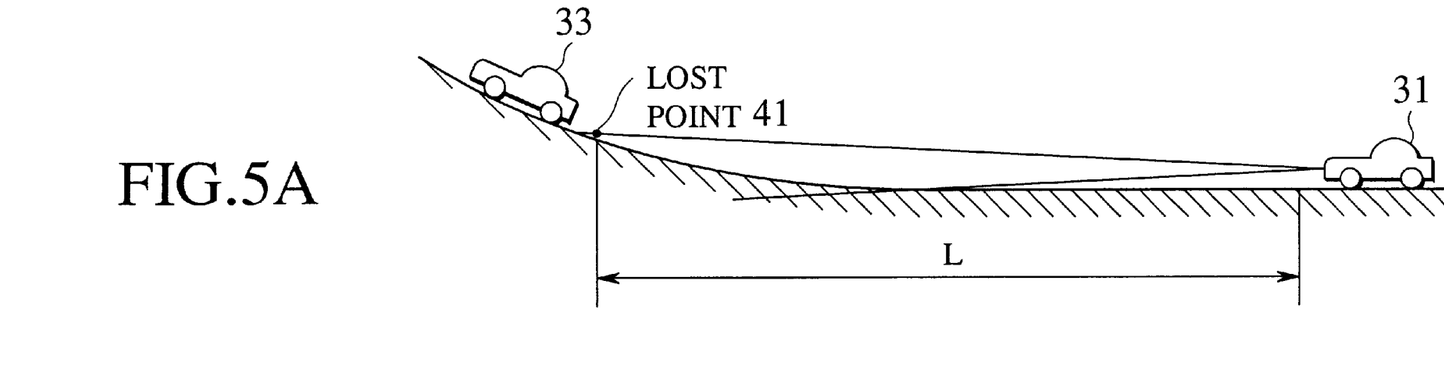
FIG. 5A is a diagram illustrating that the preceding vehicle going up a slope.
Figure 5B:
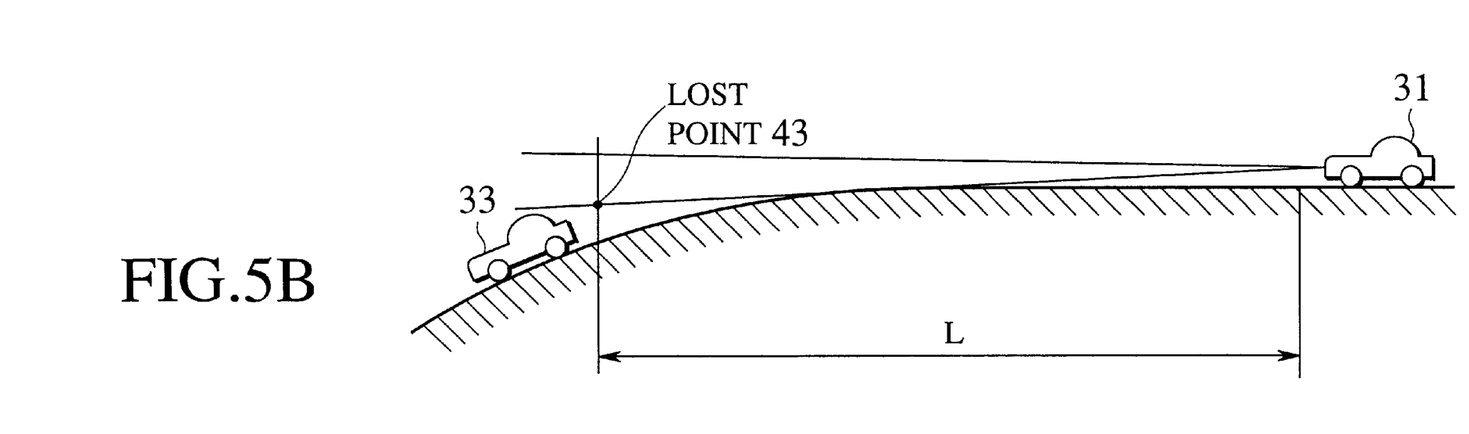
FIG. 5B is a diagram illustrating that the preceding vehicle going down a slope.

Next, referring to FIGS. 5A and 5B, we describe the operation of the automatic speed control device 1 while using a flow chart of FIG. 4. Note, FIG. 5A illustrates the preceding vehicle going uphill, while FIG. 5B illustrates the preceding vehicle going downhill.

At first step S210, it is judged whether or not the preceding vehicle is traveling in front of the driver's vehicle on the basis of the detection signal from the distance measuring sensor 3. In case of existing the preceding vehicle, the routine skips to step S320. In case of no preceding vehicle on the other hand, then the routine goes to step S220.

Next, at step S220, it is judged whether or not the device 1 loses track of the preceding vehicle on the basis of the distance measuring sensor 3. When losing the preceding vehicle, it is firstly executed to detect a distance L between the driver's vehicle and the lost point by the detection signal from the distance measuring sensor 3. At the same time, by integrating the actual vehicle speed outputted from the vehicle speed sensor 3, it is carried out to measure a traveling distance of the driver's vehicle that it travels since the device 1 has lose the preceding vehicle. In this way, the routine goes to step S230. On the other hand, in case of still capturing the preceding vehicle, the routine skips to step S320.

At step S320, it is carried out to control the distance between the vehicles as the above-mentioned normal operation of the device 1. Thus, the target speed determining section 11 determines the vehicle's target speed corresponding to the distance between the vehicles and the vehicle speed of the driver's vehicle. At this time, the selector unit 15 selects a smaller one of the vehicle's target speed determined by the target speed determining section 11 and the vehicle's set speed stored by the set-speed storing section 13. At subsequent step S330, it is executed by the speed control section 17 to calculate the opening command, the position command and the hydraulic pressure command corresponding to the vehicle speed generated from the selector unit 15 and generate these commands to the throttle 21, the automatic transmission (A/F) 23 and the brake 25, respectively. Consequently, the driver's vehicle is automatically decelerated for the preset distance between the vehicles and thereafter, the vehicle keeps on traveling while maintaining the preset distance between the vehicles.

At step S230, it is executed that the vehicle travels while maintaining the vehicle speed before losing the preceding vehicle. In detail, the selector unit 15 allows the target speed determining section 11 to memorize the vehicle speed at a point of time when the preceding vehicle has traveled in front of the driver's vehicle and generates the vehicle speed to the speed control section 17. Then, the speed control section 17 calculates the opening command, the position command and the hydraulic pressure command corresponding to the vehicle speed generated from the selector unit 15 and generates these commands to the throttle 21, the automatic transmission (A/F) 23 and the brake 25, respectively. Consequently, the driver's vehicle keeps on traveling at the so-established vehicle speed.

Next, at step S240, it is judged whether or not there is a slope change in the vicinity of the lost point where the preceding vehicle was lost. In other words, it is judged whether a motion vector of the preceding vehicle before being lost directed upward or downward, on the basis of the detection signal from the distance measuring sensor 3. In detail, when the preceding vehicle enters an uphill slope as shown in FIG. 5A or when the preceding vehicle enters a downhill slope as shown in FIG. 5B, the preceding vehicle will be lost after the motion vector has changed upward or downward, respectively. Note, upon memorizing a vertical position of the preceding vehicle obtained by the detection signal from the distance measuring sensor 3 and when a difference between the vertical position obtained in the present routine and that obtained in the previous routine exceeds a predetermined value, then it is judged that the motion vector of the preceding vehicle changes upward or downward. When the judgement at step S240 is Yes, that is, there is a slope change in the vicinity of the lost point, then the routine goes to step S270. On the contrary, when the judgement at step S240 is No, that is, there is no slope change in the vicinity of the lost point, then the routine goes to step S250.

At step S250, it is judged whether or not the device 1 discovers the preceding vehicle again before the driver's vehicle arrives at the lost point. Thus, it is judged whether the device 1 detects the preceding vehicle on the basis of the detection signal from the distance measuring sensor 3. If the preceding vehicle is detected (Yes), then the routine goes to step S320. On the other hand, if the preceding vehicle is not detected (No), then the routine returns to step S260.

Next, at step S260, it is judged whether or not the driver's vehicle has just arrived at the lost point where the preceding vehicle was lost. In other words, it is judged whether or not the traveling distance resulting from the integration of actual vehicle's velocity amounts to the distance L for the lost point detected by the distance measuring sensor 3 at step S220. When the judgement at step S260 is Yes, that is, the vehicle has arrived at the lost point, then the routine goes to step S320. On the contrary, when the judgement at step S260 is No, that is, the vehicle has not arrived at the lost point yet, then the routine goes to step S230.

At step S270 in case of the slope change in the vicinity of the lost point, it is executed to initiate a counting of pulse signals of a rotary encoder, which are generated from the vehicle speed sensor 5, in order to examine whether the driver's vehicle travels the distance L to the lost point.

At next step S280, it is executed that the vehicle travels while maintaining the vehicle speed before losing the preceding vehicle. In detail, a process similar to that at step S230 is carried out.

At step S290, it is judged whether or not there is a slope change on a road where the vehicle travels. In detail, a process similar to that at step S240 is carried out. When the judgement at step S290 is Yes, that is, there is the slope change in the vicinity of the lost point, then the routine goes to step S270. On the contrary, when the judgement at step S290 is No, that is, there is no slope change in the vicinity of the lost point, then the routine goes to step S300.

At step S300, it is judged whether or not the device 1 discovers the preceding vehicle. Thus, it is judged whether the device 1 detects the preceding vehicle on the basis of the detection signal from the distance measuring sensor 3. If the preceding vehicle is detected (Yes), then the routine goes to step S320. On the other hand, if the preceding vehicle is not detected (No), then the routine returns to step S310.

At step S310 in case of detecting no preceding vehicle, it is judged whether the driver's vehicle has traveled the distance L to the lost point. That is, in order words, it is determined whether a count number of the pulse signals of the rotary encoder of the vehicle speed sensor 5 exceeds a count number established corresponding to the set distance L. Therefore, if the detected counts exceeds the established count number (Yes), then the routine goes to step S320. On the other hand, if the detected counts does not exceed the established count number (No), then the routine returns to step S280 and thereafter, a series of above-mentioned processes are repeated unless "Yes" at step S310.

As shown in FIGS. 5A and 5B, until the driver's vehicle's reaching the lost point 41 (or 43) at least, the driver's vehicle 31 is subjected to the slope change. Therefore, in case of losing the preceding vehicle because of the slope change on the road, the vehicle 31 is controlled so as to maintain the vehicle speed. On the contrary, in case of no slope change, the vehicle begins to accelerated to the set speed on judgement that the preceding vehicle has escaped out of the traffic lane of the driver's vehicle's. In this way, it is possible to prevent the driver's vehicle from approaching the preceding vehicle incautiously.

Further, even after the slope change has been detected, the preceding vehicle is expected to enter the distance measuring area again in case of a regular slope of the distance between the vehicles which is established originally. However, if there exists an additional slope change within the preset distance between the vehicles, the preceding vehicle will not enter the distance measuring area. Therefore, according to the embodiment, it is carried out to count a traveling distance whenever the slope change is detected. Unless detecting the preceding vehicle again while the driver's vehicle travels at least the originally-established distance between the vehicles, the vehicle is controlled so as to maintain the present vehicle speed. Then, when no slope change has been detected at a point of time is of traveling the whole distance between the vehicles, then the vehicle is begun to accelerate to the set speed in consideration that the preceding vehicle has escaped out of the traffic lane of the driver's vehicle's. In this way, it is possible to realize the driving control reflecting the driver's will while preventing the incautious approaching between the preceding vehicle and the driver's vehicle.

(3rd. embodiment)

The systematic constitution of an automatic speed control device in accordance with a third embodiment of the present invention is similar to that of the automatic speed control device 1 of FIG. 1. Therefore, a description regarding to the constitution will be deleted.

Figure 6:
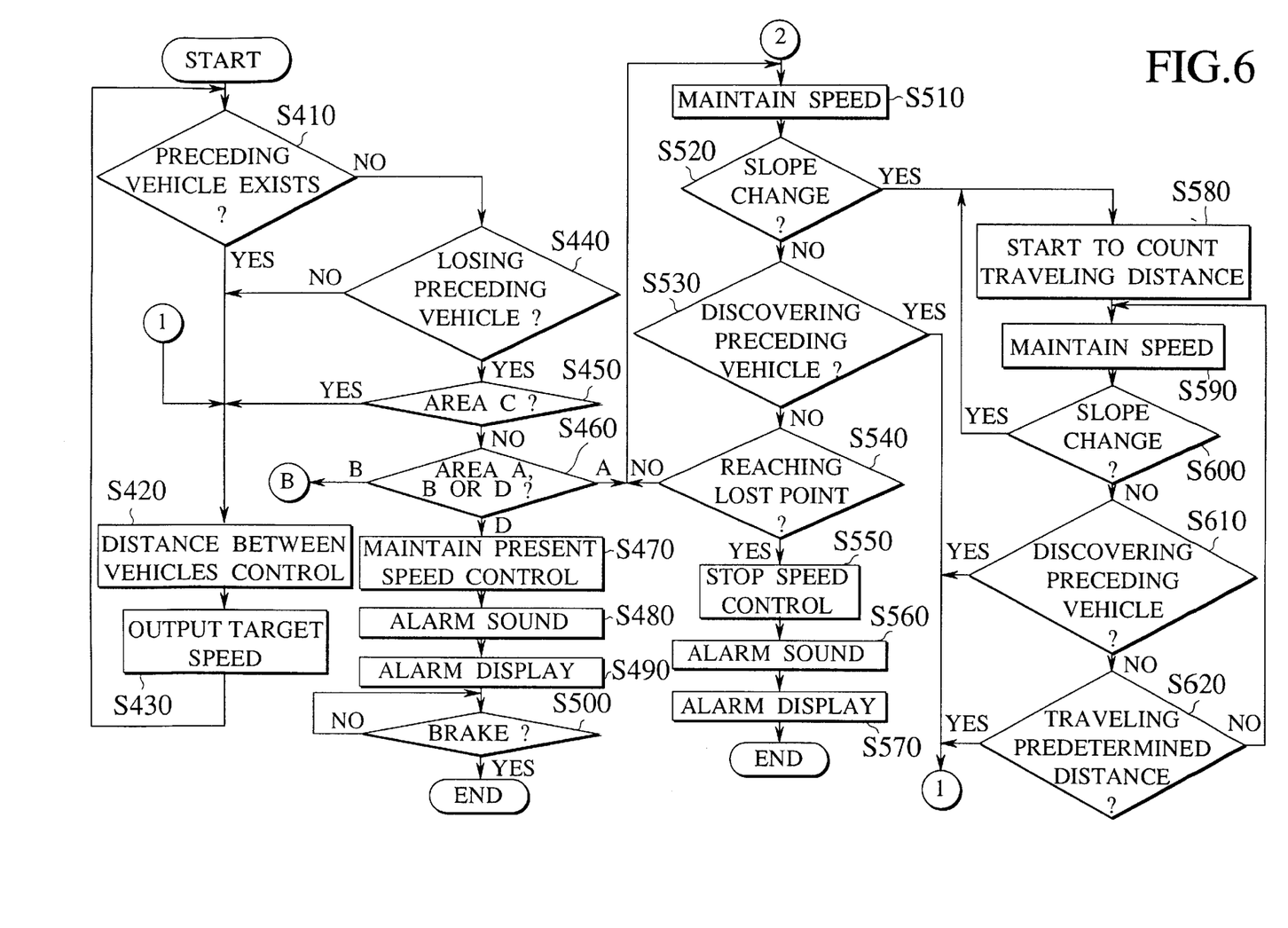
FIG. 6 is a part of a flow chart for explanation of an operation of the automatic speed control device of the third embodiment of the invention.
Figure 7:
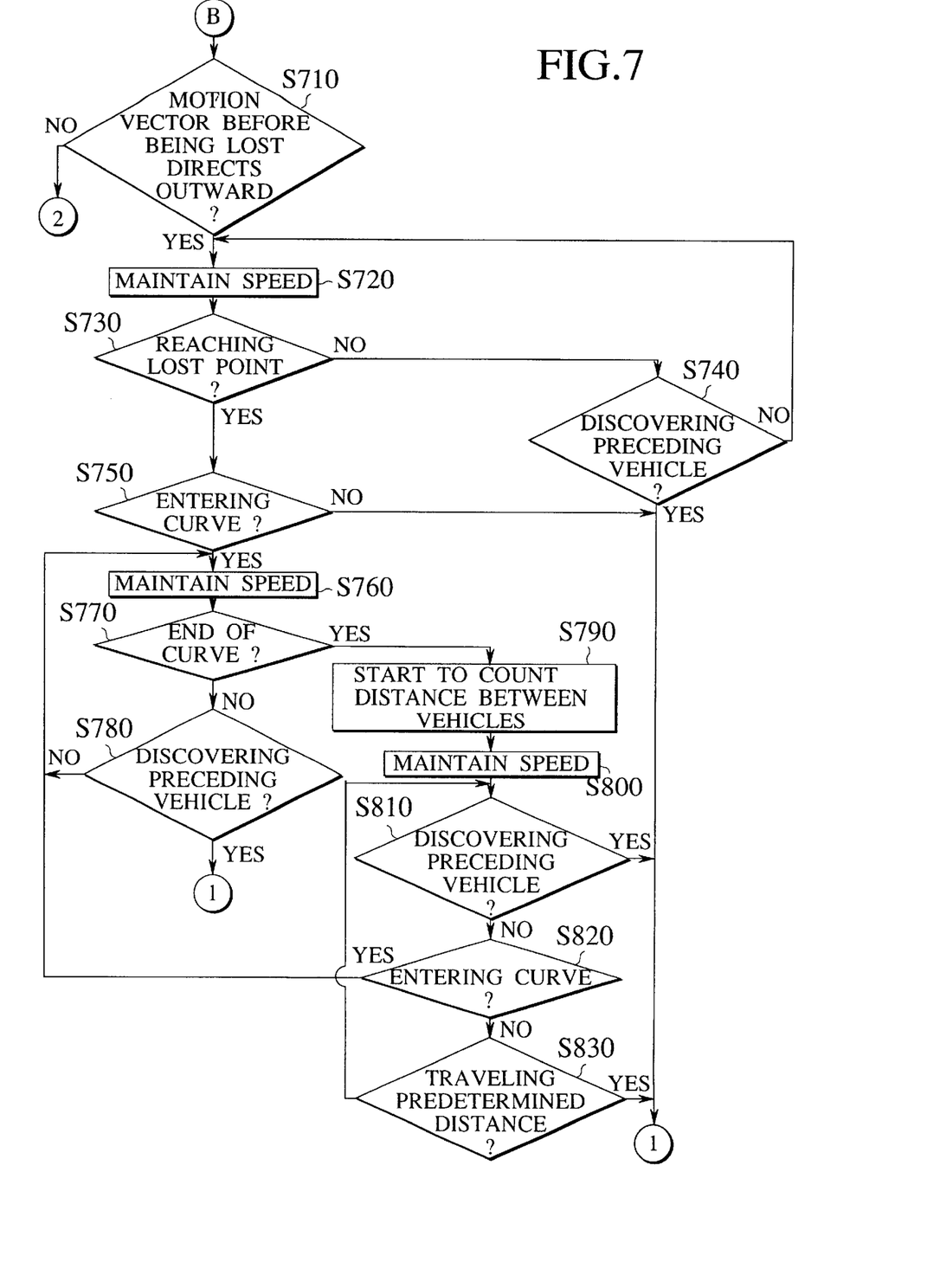
FIG. 7 is a remaining part of the flow chart of FIG. 6, for explanation of the operation of the automatic speed control device of the third embodiment of the invention.
Figure 8:
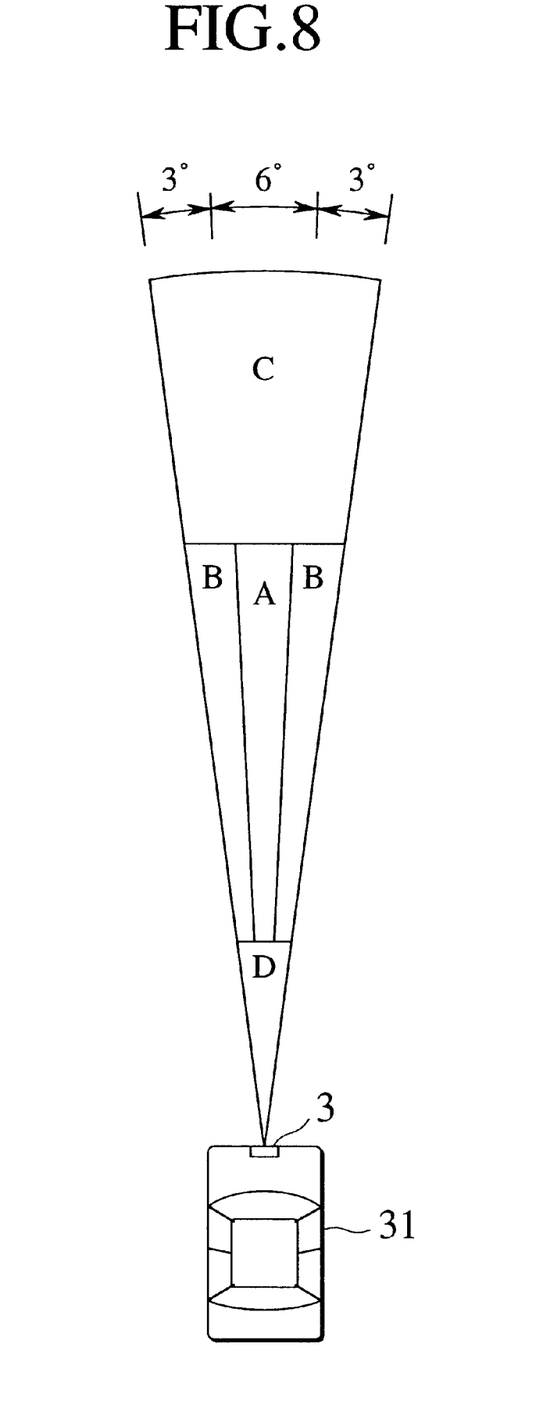
FIG. 8 is a diagram illustrating a distance measuring area of a distance measuring sensor.

Next, referring to FIG. 8, we describe the operation of the automatic speed control device 1 while using a flow chart of FIGS. 6 and 7. Note, FIG. 8 illustrates a distance measuring area of the distance measuring sensor 3.

The distance measuring sensor 3 of FIG. 8 is provided with a scanning type of radar which scans with an angle of e.g. ±6 degrees in the horizontal direction and an angle of e.g. ±2 degrees in the vertical direction at respective intervals of e.g. 0.1 to 0.2 degrees in sequence. According to the embodiment, the distance measuring area of the distance measuring sensor 3 is classified into respective areas A, B, C and D.

At first step S410, it is judged whether or not the preceding vehicle is traveling in front of the driver's vehicle on the basis of the detection signal from the distance measuring sensor 3. In case of existing the preceding vehicle, the routine skips to step S420. In case of no preceding vehicle on the other hand, then the routine goes to step S440.

At step S420, it is carried out to control the distance between the vehicles as the above-mentioned normal operation of the device 1. Thus, the target speed determining section 11 determines the vehicle's target speed corresponding to the distance between the vehicles and the vehicle speed of the driver's vehicle. At this time, the selector unit 15 selects a smaller one of the vehicle's target speed determined by the target speed determining section 11 and the vehicle's set speed stored by the set-speed storing section 13. At subsequent step S430, it is executed by the speed control section 17 to calculate the opening command, the position command and the hydraulic pressure command corresponding to the vehicle speed generated from the selector unit 15 and generate these commands to the throttle 21, the automatic transmission (A/F) 23 and the brake 25, respectively. Consequently, the driver's vehicle is automatically decelerated for the preset distance between the vehicles and thereafter, the vehicle keeps on traveling while maintaining the preset distance between the vehicles.

Next, at step S440, it is judged whether or not the device 1 loses track of the preceding vehicle on the basis of the distance measuring sensor 3. When losing the preceding vehicle, it is firstly executed to detect a distance L between the driver's vehicle and the lost point by the detection signal from the distance measuring sensor 3. At the same time, by integrating the actual vehicle speed outputted from the vehicle speed sensor 3, it is carried out to measure a traveling distance of the driver's vehicle that it travels since the device 1 has lost the preceding vehicle. In this way, the routine goes to step S450. On the other hand, in case of still capturing the preceding vehicle, the routine skips to step S420.

At step S450, it is judged whether the distance measuring area where the preceding vehicle has been lost is identical to the distance measuring area C of FIG. 8. That is, it is judged whether or not the distance measuring area corresponding to the distance and angle between the driver's vehicle and the preceding vehicle is the distance measuring area C on the basis of the detection signal of the distance measuring sensor 3. In case of the distance measuring area C, then the routine goes to step S420. On the contrary, if not the distance measuring area C, then the routine goes to step S460.

At subsequent step S460, it is judged which of the distance measuring areas A, B and C of FIG. 8 the distance measuring area where the preceding vehicle was lost is. In the case of losing the preceding vehicle in the distance measuring area A, the routine goes to step S510, while the routine goes to step S710 in the case of losing the vehicle in the distance measuring area B. Additionally, in the case of losing the preceding vehicle in the distance measuring area C, then the routine goes to step S470.

At step S470, on consideration that the distance measuring sensor 3 is not in its detectable condition since the driver's vehicle approaches the preceding vehicle too much, when the driver's vehicle was decelerated just before the losing, it is executed to maintain the deceleration rate. Alternatively, when the driver's vehicle was accelerated or traveled at a constant speed, then it is executed to maintain the vehicle speed at a point of time of losing the preceding vehicle. Corresponding to the so-determined vehicle speed, the speed control section 17 calculates the opening command, the position command and the hydraulic pressure command corresponding to the vehicle speed generated from the selector unit 15 and generates these commands to the throttle 21, the automatic transmission (A/F) 23 and the brake 25, respectively.

Next, at step S480 in case of losing the preceding vehicle, it is executed to raise an alarm of "step on brake" to the driver by means of an alarm unit 19. Further, at step S490, it is also executed to emit a warning lamp representing "step on brake" to the driver by means of the same alarm unit 19. Note, the alarm representing "step on brake" by the alarm unit 19 may be replaced with an information expressing "immeasurable".

At step S500, it is judged whether the driver has stepped on the brake 25 or not. If the brake 25 has been stepped on, the routine is ended. On the contrary, if the brake 25 has not been stepped on, the routine returns to step S500 and thereafter, the judging process of step S500 is repeated unless "Yes" at the same step.

On the other hand, at step S510 in case of losing the preceding vehicle in the distance measuring area A, it is executed that the vehicle travels while maintaining the vehicle speed before losing the preceding vehicle. In detail, the processes similar to those at step S230 are carried out.

Next, at step S520, it is judged whether or not there is a slope change in the vicinity of the lost point where the preceding vehicle was lost. In other words, it is judged whether a motion vector of the preceding vehicle before being lost directs upward or downward, on the basis of the detection signal from the distance measuring sensor 3. When the judgement at step S520 is Yes, that is, there is a slope change in the vicinity of the lost point, then the routine goes to step S580. On the contrary, when the judgement at step S520 is No, that is, there is no slope change in the vicinity of the lost point, then the routine goes to step S530.

At step S530, it is judged whether or not the device 1 discovers the preceding vehicle again before the driver's vehicle arrives at the lost point. Thus, it is judged whether the device 1 detects the preceding vehicle on the basis of the detection signal from the distance measuring sensor 3. If the preceding vehicle is detected (Yes), then the routine goes to step S420. On the other hand, if the preceding vehicle is not detected (No), then the routine returns to step S540.

Next, at step S540, it is judged whether or not the driver's vehicle has just arrived at the lost point where the preceding vehicle was lost. In other words, it is judged whether or not the traveling distance resulting from the integration of actual vehicle's velocity amounts to the distance L for the lost point detected by the distance measuring sensor 3 at step S440. When the judgement at step S540 is Yes, that is, the vehicle has arrived at the lost point, then the routine goes to step S550. On the contrary, when the judgement at step S540 is No, that is, the vehicle has not arrived at the lost point yet, then the routine goes to step S510 and thereafter, a series of the above-mentioned processes are repeated unless "Yes" at step S540.

When the driver's vehicle reaches the lost point where the preceding vehicle was lost, it is executed at step S550 to stop the operation of the automatic speed control device 1 into the manual mode by the speed control section 17 because it is estimated that the distance measuring condition might get worse due to a climatic change etc. or the distance measuring sensor 3 might have a malfunction.

At next step S560, it is carried out to raise an alarm of "control stop" to the driver by means of an alarm unit 19. Further, at step S570, it is also executed to emit a warning lamp representing "control stop" to the driver by means of the same alarm unit 19 and thereafter, the routine is ended.

At step S580 in case of the slope change in the vicinity of the lost point, it is executed to initiate a counting of pulse signals of a rotary encoder, which are generated from the vehicle speed sensor 5, in order to examine whether the driver's vehicle travels the distance L to the lost point.

At next step S590, it is executed that the vehicle travels while maintaining the vehicle speed before losing the preceding vehicle. In detail, a process similar to that at step S230 is carried out.

At step S600, it is judged whether or not there is a slope change on a road where the vehicle travels. In detail, a process similar to that at step S240 is carried out. When the judgement at step S600 is Yes, that is, there is the slope change in the vicinity of the lost point, then the routine goes to step S580 and thereafter, a series of processes (steps S580 to S600) are repeated unless "No" at step S600. On the contrary, when the judgement at step S600 is No, that is, there is no slope change in the vicinity of the lost point, then the routine goes to step S610.

At step S610, it is judged whether or not the device 1 discovers the preceding vehicle. Thus, it is judged whether the device 1 detects the preceding vehicle on the basis of the detection signal from the distance measuring sensor 3. If the preceding vehicle is detected (Yes), then the routine goes to step S420. On the other hand, if the preceding vehicle is not detected (No), then the routine returns to step S620.

At step S620 in case of detecting no preceding vehicle, it is judged whether the driver's vehicle has traveled the distance L to the lost point. That is, in other words, it is determined whether a count number of the pulse signals of the rotary encoder of the vehicle speed sensor 5 exceeds a count number established corresponding to the set distance L. Therefore, if the detected counts exceeds the established count number (Yes), then the routine goes to step S420. On the other hand, if the detected counts does not exceed the established count number (No), then the routine returns to step S590 and thereafter, a series of above-mentioned processes are repeated unless "Yes" at step S620.

On the other hand, at step S710 in case of losing the preceding vehicle in the area B, it is judged whether or not a motion vector of the preceding vehicle before being lost directed outward, on the basis of the detection signal from the distance measuring sensor 3. In detail, if the preceding vehicle enters a curve, the preceding vehicle will be lost after the motion vector has changed outward. Note, upon memorizing a horizontal position of the preceding vehicle obtained by the detection signal from the distance measuring sensor 3 and when a difference between the horizontal position obtained in the present routine and that obtained in the previous routine exceeds a predetermined value, then it is judged that the motion vector of the preceding vehicle changes outward. When the judgement at step S710 is Yes, that is, in case of the outward motion vector, then the routine goes to step S720. On the contrary, when the judgement at step S710 is No, then the routine goes to step S510.

At step S720, it is executed to travel the vehicle while maintaining the vehicle speed before losing the preceding vehicle. In detail, the similar process as that of step S30 is carried out.

Next, at step S730, it is judged whether or not the driver's vehicle has just arrived at the lost point where the preceding vehicle was lost. In other words, it is judged whether or not the traveling distance resulting from the integration of actual vehicle's velocity amounts to the distance L for the lost point detected by the distance measuring sensor 3 at step S440. When the judgement at step S730 is Yes, that is, the vehicle has arrived at the lost point, then the routine goes to step S750. On the contrary, when the judgement at step S730 is No, that is, the vehicle has not arrived at the lost point yet, then the routine goes to step S740.

At step S740, it is judged whether or not the device 1 discovers the preceding vehicle again before the driver's vehicle arrives at the lost point. Thus, it is judged whether the device 1 detects the preceding vehicle on the basis of the detection signal from the distance measuring sensor 3. If the preceding vehicle is detected (Yes), then the routine goes to step S420. On the other hand, if the preceding vehicle is not detected (No), then the routine returns to step S720 and thereafter, a series of processes are repeated.

At step S750, since the driver's vehicle has arrived at the lost point, it is judged whether or not the driver's vehicle enters a curve now. Thus, it is judged whether the steering angle exceeds a predetermined angle on the basis of the detection signal from the steering angle sensor 7. Now, it should be noted that such a case as losing the preceding vehicle is a case that the preceding vehicle enters the curve. (see FIG. 3A) When the driver's vehicle enters the curve, then the routine goes to step S760. On the other hand, when the driver's vehicle does not enter the curve but travels on a straight road, the routine goes to step S420.

At step S760, as it can be estimated the preceding vehicle travels ahead of the curve, it is executed to allow the driver's vehicle to travel while maintaining the vehicle speed before losing the preceding vehicle. In detail, the similar process as that of step S30 is carried out.

At step S770, it is judged whether or not the driver's vehicle escapes out of the curve. Thus, it is judged whether the steering angle is less than the predetermined angle on the basis of the detection signal from the steering angle sensor 7. If the driver's vehicle does escape out of the curve (Yes), then the routine goes to step S790. On the other hand, if the driver's vehicle has not escaped out of the curve yet (No), then the routine returns to step S780.

At step S780, it is judged whether or not the device 1 discovers the preceding vehicle despite that the driver's vehicle has not escaped out of the curve yet. Thus, it is judged whether the device 1 detects the preceding vehicle on the basis of the detection signal from the distance measuring sensor 3. If the preceding vehicle is detected (Yes), then the routine goes to step S420. On the other hand, if the preceding vehicle is not detected (No), then the routine returns to step S760 and thereafter, a series of processes will be repeated by the time of "Yes" at either step S770 or step S780.

At step S790 in case of the vehicle's escaping the curve, it is started to count the number of pulse signals of a rotary encoder, which are generated from the vehicle speed sensor 5, in order to examine whether the driver's vehicle travels the distance L to the lost point.

At next step S800, it is executed to maintain the vehicle speed before losing the preceding vehicle, as similar at step S30.

At step S810, it is judged whether or not the device 1 discovers the preceding vehicle. Thus, it is judged whether the device 1 detects the preceding vehicle on the basis of the detection signal from the distance measuring sensor 3. If the preceding vehicle is detected (Yes), then the routine goes to step S420. On the other hand, if the preceding vehicle is not detected (No), then the routine returns to step S820.

At step S820, since the preceding vehicle could not be detected, it is judged whether or not the driver's vehicle enters a curve now. Thus, it is judged whether the steering angle exceeds a predetermined angle on the basis of the detection signal from the steering angle sensor 7. Now, it should be noted that such a case that no preceding vehicle was detected means that the preceding vehicle has entered a next curve. When the driver's vehicle enters the curve, then the routine goes to step S760. On the other hand, when the driver's vehicle does not enter the curve but travels on a straight road, the routine goes to step S830.

At next step S830, it is judged whether the driver's vehicle has traveled the distance L to the lost point. That is, in order words, it is determined whether the number of the pulse signals of the rotary encoder of the vehicle speed sensor 5 exceeds the number of counts corresponding to the set distance L. Therefore, if the detected counts exceeds the established number (Yes), then the routine goes to step S420. On the other hand, if the detected counts does not exceed the established number (No), then the routine returns to step S800 and thereafter, a series of above-mentioned processes are repeated unless "Yes" at either step S810 or step S830.

In this way, when the preceding vehicle enters the curve and deviates from the distance measuring area of the distance measuring sensor 3, the preceding vehicle is sure to be lost while keeping the outward motion vector on the left or right side of the distance measuring area. In case of losing the preceding vehicle due to the slope change, there is a possibility of deviating from the distance measuring area suddenly. Additionally, if employing a photo sensor which limits an object to be detected to a reflective object and if the preceding vehicle approaches the driver's vehicle too much, there is a possibility that a reflective portion of the preceding vehicle deviates from the distance measuring area, so that the preceding vehicle is lost.

Therefore, according to the embodiment, in case of losing the preceding vehicle in the far area C of FIG. 8, the driver's vehicle is controlled so as to travel at the established vehicle speed on the assumption that there is no preceding vehicle. Because the area C is positioned in the vicinity of a limiting point of the distance measuring sensor.

In the case of losing the preceding vehicle in the area D on condition that the driver's vehicle just before losing has been decelerated, it is carried out to maintain the deceleration ratio at that time and inform the driver of the device's losing the preceding vehicle, on the assumption that the device 1 lost the preceding vehicle because of the driver's vehicle's approaching it too much. Alternatively, when the driver's vehicle just before losing has been accelerated or traveled at a constant speed, it is carried out to maintain a speed at a point of time of losing the preceding vehicle and inform the driver of the device's losing the preceding vehicle.

Further, in the case of losing the preceding vehicle in the area B while its representing the outward motion vector, then the driver's vehicle is driven to the lost point and thereafter, it is carried out to control the vehicle in the same manner as the control method of the first embodiment, on the assumption that the preceding vehicle has entered the curve or changed the traffic lane.

Further, in the case of losing the preceding vehicle in the area A or B while its representing the inward motion vector, then the driver's vehicle is controlled to travel to the lost point while maintaining the present vehicle speed on the assumption that the preceding vehicle could not be detected due to the slope change. However, if the slope change is not detected despite that the driver's vehicle has traveled to the lost point, it is judged that the losing of the preceding vehicle is not due to the load configuration but the distance measuring condition for the worse by the weather etc. or the malfunction of the distance measuring sensor. In such a case, by at least informing the driver of the impossibility of distance measuring, it is possible to let the operation of the automatic speed control device 1 come near the driver's will and prevent the distance between the vehicles from being decreased incautiously. Furthermore, it is possible to inform the driver of the reliability of sensing the preceding vehicle.

Note, as to the judgement in the case of the driver's vehicle's traveling the curve, the automatic speed control device may be modified as follows. In the modification, even if the driver's vehicle escapes the curve and sequentially enters the straight load, a selection of either returning to the set speed or maintaining the present speed is executed in condition of allowing the driver's vehicle to travel a predetermined distance and sequent detecting whether or not the driver's vehicle enters again the curve in the travel. With the modification, in even a case of a load of S-shaped curves or discontinuous curves, it is possible to prevent the distance between the vehicles from being decreased incautiously.

Finally, it will be understood by those skilled in the art that the foregoing description relates to three preferred embodiments of the automatic speed control device, and that various changes and modifications may be made to the present invention without departing from the spirit and scope thereof.

What is claimed is:

1. An automatic speed control device for controlling a speed of a driver's vehicle depending on an existence of a preceding vehicle traveling ahead of the driver's vehicle, the automatic speed control device comprising:

a speed control section for controlling a vehicle speed of the driver's vehicle so as to realize a predetermined distance between the driver's vehicle and the preceding vehicle when there exists the preceding vehicle traveling ahead of the driver's vehicle, the predetermined distance being established corresponding to both of the vehicle speed of the driver's vehicle and a vehicle speed of the preceding vehicle in advance, and further controlling the driver's vehicle to accelerate to a preset vehicle speed when the preceding vehicle is lost;

wherein, when losing track of the preceding vehicle, the speed control section at least controls the vehicle speed of the driver's vehicle so as to maintain a vehicle speed of the driver's vehicle at a time of losing the preceding vehicle at least until the driver's vehicle arrives at a lost point where the preceding vehicle was lost.

2. An automatic speed control device for controlling a speed of a driver's vehicle depending on an existence of a preceding vehicle ahead of the driver's vehicle, the automatic speed control device comprising:

a distance measuring unit for measuring a distance between the driver's vehicle and the preceding vehicle;

a speed detecting unit for detecting a vehicle speed of the driver's vehicle;

a target speed determining unit for determining a target speed corresponding to the distance detected by the distance measuring unit and the vehicle speed detected by the speed detecting unit;

a speed storing section for storing the vehicle speed detected by the speed detecting unit as a set speed, in accordance with a manual operation performed by the driver;

a selecting section for selecting a smaller speed of the target speed determined by the target speed determining unit and the set speed stored by the speed storing unit; and a speed control section for controlling the vehicle speed so as to be the smaller speed selected by the selecting unit;

wherein, when losing the preceding vehicle, the speed control unit further controls the vehicle speed so as to maintain a vehicle speed of the driver's vehicle at a time of losing the preceding vehicle until the driver's vehicle arrives at a lost point where the preceding vehicle was lost, wherein, when losing the preceding vehicle while the selecting section selects the target speed, the speed control unit controls the vehicle speed so as to maintain the target speed until the driver's vehicle arrives at the lost point, and furthermore, when still losing the preceding vehicle even after the driver's vehicle has arrived at the lost point, the speed control unit further controls the vehicle speed so as to change the target speed to the set speed.

3. The automatic speed control device of claim 2, wherein, when the preceding vehicle cannot be detected by the distance measuring unit and when the lost point is included in a curve larger than a predetermined curve, the speed control section controls the vehicle speed so as to maintain a vehicle speed of the driver's vehicle at a time of losing the preceding vehicle.

4. The automatic speed control device of claim 2, wherein, when the preceding vehicle cannot be detected by the distance measuring unit and when the lost point is contained in a straight load, the speed control section controls the vehicle speed so as to increase to the set speed stored in the speed storing section.

5. The automatic speed control device of claim 2, further comprising a steering angle detecting unit for detecting a steering angle of the driver's vehicle, wherein, when it is judged on the basis of the steering angle of the driver's vehicle that the driver's vehicle is traveling in a regular curve represented by a steering angle more than a predetermined steering angle, the speed control section controls the vehicle speed so as to maintain a present vehicle speed.

6. The automatic speed control device of claim 2, wherein the speed control section controls the vehicle speed so as to maintain a present vehicle speed until the preceding vehicle is detected again by the distance measuring unit.

7. The automatic speed control device of claim 2, further comprising a steering angle detecting unit for detecting a steering angle of the driver's vehicle, wherein, when it is judged on the basis of the steering angle of the driver's vehicle that the driver's vehicle travels in a curve larger than a predetermined curve and when no preceding vehicle travels in front of the driver's vehicle, the speed control section controls the vehicle speed so as to increase to the set speed.

8. An automatic speed control device for controlling a speed of a driver's vehicle depending on an existence of a preceding vehicle traveling ahead of a driver's vehicle, the automatic speed control device comprising:

a distance measuring unit for measuring a distance between the driver's vehicle and the preceding vehicle and an angle of the preceding vehicle to the driver's vehicle;

a speed detecting unit for detecting a vehicle speed of the driver's vehicle;

a steering angle detecting unit for detecting a steering angle of the driver's vehicle;

a slope change judging section for judging whether there is a predetermined slope change at a traveling point of the preceding vehicle, on the basis of an angle of the preceding vehicle;

a target speed determining section for determining a target speed corresponding to the distance detected by the distance measuring unit and the vehicle speed detected by the speed detecting unit;

a speed storing section for storing the vehicle speed detected by the speed detecting unit as a set speed;

a selecting section for selecting a smaller speed of the target speed determined by the target speed determining section and the set speed stored by the speed storing section; and a speed control section for controlling the vehicle speed so as to be the smaller speed selected by the selecting section;

wherein, when the preceding vehicle is lost and it is judged that there exists the predetermined slope change in the vicinity of a lost point of losing the preceding vehicle by the slope change judging section, the speed control section further controls the vehicle speed so as to maintain a vehicle speed of the driver's vehicle at a time of losing the preceding vehicle.

9. The automatic speed control device of claim 8, wherein, when the preceding vehicle is lost and when it is judged that there is no slope change in the lost point by the slope change judging section, the speed control section controls the vehicle speed so as to increase to the set speed.

10. The automatic speed control device of claim 8, wherein, when the preceding vehicle is lost and it is judged that there exists the predetermined slope change in the vicinity of a lost point of losing the preceding vehicle by the slope change judging section, the speed control section further controls the vehicle speed so as to maintain the present vehicle speed as long as a predetermined distance.

11. The automatic speed control device of claim 10, wherein, when no preceding vehicle is detected even after the driver's vehicle's traveling the predetermined distance, the speed control section controls the vehicle speed so as to increase to the set speed.

12. The automatic speed control device of claim 8, further comprising:

a distance measuring area judging section for judging which parts of a distance measuring area of the distance measuring unit the preceding vehicle is traveling, on the basis of the distance and the angle detected by the distance measuring unit, wherein, when the preceding vehicle is lost in a central part of the distance measuring area and it is judged that there exists the predetermined slope change in the vicinity of the lost point of losing the preceding vehicle, the speed control section further controls the vehicle speed so as to maintain the present vehicle speed.

13. The automatic speed control device of claim 8, further comprising:

a distance measuring area judging section for judging which parts of a distance measuring area of the distance measuring unit the preceding vehicle is traveling, on the basis of the distance and the angle detected by the distance measuring unit; and an informing unit for informing the driver that the distance measuring unit is in an inactivated condition when the preceding vehicle is lost in a central part of the distance measuring area and it is judged that there is no slope change in the vicinity of the lost point of losing the preceding vehicle.

14. An automatic speed control device for controlling a speed of a driver's vehicle depending on an existence of a preceding vehicle ahead of the driver's vehicle, the automatic speed control device comprising:

a distance measuring unit for measuring a distance between the driver's vehicle and the preceding vehicle;

a speed detecting unit for detecting a vehicle speed of the driver's vehicle;

a target speed determining unit for determining a target speed corresponding to the distance detected by the distance measuring unit and the vehicle speed detected by the speed detecting unit;

a speed storing section for storing the vehicle speed detected by the speed detecting unit as a set speed, in accordance with a manual operation performed by the driver;

a selecting section for selecting a smaller speed of the target speed determined by the target speed determining unit and the set speed stored by the speed storing unit; and a speed control section for controlling the vehicle speed so as to be the smaller speed selected by the selecting unit;

wherein, when losing the preceding vehicle, the speed control unit further controls the vehicle speed so as to maintain a vehicle speed of the driver's vehicle at a time of losing the preceding vehicle until the driver's vehicle arrives at a lost point where the preceding vehicle was lost, wherein, when the preceding vehicle cannot be detected by the distance measuring unit and when the lost point is included in a curve larger than a predetermined curve, the speed control section controls the vehicle speed as so t o maintain the vehicle speed at the driver's vehicle at a time of losing the preceding vehicle, the automatic speed control device further comprising:

a distance measuring area judging section for judging which parts of a distance measuring area of the distance measuring unit the preceding vehicle is traveling, on the basis of the distance and the angle detected by the distance measuring unit; and a motion vector detecting section for detecting a motion vector representing that the preceding vehicle moves laterally, wherein, when the preceding vehicle is lost in an outside part of the distance measuring area and when the motion vector before losing the preceding vehicle directs outward, the speed control section controls the vehicle speed so as to either maintain the present vehicle speed or increase to the set speed; and wherein, when the preceding vehicle is lost in an outside part of the distance measuring area and when the motion vector before losing the preceding vehicle directs inward, the speed control section selects any one of the control methods of:

maintaining the present vehicle speed;

increasing the present vehicle speed to the set speed; and maintaining the present vehicle speed as long as a predetermined distance.

15. The automatic speed control device of claim 2, further comprising:

a distance measuring area judging section for judging which parts of a distance measuring area of the distance measuring unit the preceding vehicle is traveling, on the basis of the distance and the angle detected by the distance measuring unit, wherein, when the preceding vehicle is lost in the farthest part of the distance measuring area, the speed control section further controls the vehicle speed so as to increase the set speed.

16. The automatic speed control device of claim 2, further comprising:

a distance measuring area judging section for judging which parts of a distance measuring area of the distance measuring unit the preceding vehicle is traveling, on the basis of the distance and the angle detected by the distance measuring unit, wherein, when the preceding vehicle is lost in the nearest part of the distance measuring area, the speed control section further controls the vehicle speed so as to maintain the vehicle speed just before losing the preceding vehicle or decrease at a deceleration rate just before losing the preceding vehicle.

17. The automatic speed control device of claim 16, further comprising:

an informing unit for informing the driver that the distance measuring unit is in an inactivated condition.

* * * * *